US008420984B2

(12) United States Patent
Kaiser et al.

(10) Patent No.: US 8,420,984 B2
(45) Date of Patent: Apr. 16, 2013

(54) HOUSEHOLD APPLIANCE

(75) Inventors: Kersten Kaiser, Rothenburg (DE); Alwin Neukamm, Wilhermsdorf (DE); Claudio Cenedese, Pasian di Prato (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 244 days.

(21) Appl. No.: 12/520,118

(22) PCT Filed: Dec. 1, 2007

(86) PCT No.: PCT/EP2007/010447

§ 371 (c)(1),
(2), (4) Date: Dec. 14, 2009

(87) PCT Pub. No.: WO2008/074391

PCT Pub. Date: Jun. 26, 2008

(65) Prior Publication Data

US 2010/0114339 A1 May 6, 2010

(30) Foreign Application Priority Data

Dec. 20, 2006 (EP) .................................... 06026455

(51) Int. Cl.

| | |
|---|---|
| ***H05B 3/68*** | (2006.01) |
| ***H05B 1/02*** | (2006.01) |
| ***H05B 6/12*** | (2006.01) |
| ***G05B 11/01*** | (2006.01) |
| ***G05B 15/00*** | (2006.01) |
| ***G05B 19/42*** | (2006.01) |
| ***G01K 1/08*** | (2006.01) |
| ***G01K 17/00*** | (2006.01) |
| ***A47J 27/62*** | (2006.01) |
| ***A47J 37/06*** | (2006.01) |

(52) U.S. Cl.
USPC ...... 219/448.12; 219/494; 219/506; 219/626; 219/627; 700/17; 700/83; 700/87; 702/132; 702/136; 99/331

(58) Field of Classification Search .............. 700/11–13, 700/17, 83, 86, 87; 715/771, 773; 219/200, 219/385, 443.1, 445.1, 446.1, 447.1, 448.11–448.13, 219/482, 490, 494, 506, 502, 518, 620–622, 219/625–627, 702, 704, 710, 714; 62/125, 62/127, 129, 132, 157–159; 99/324, 325, 99/331; 702/99, 130, 132, 136
See application file for complete search history.

(56) References Cited

U.S. PATENT DOCUMENTS 5,397,873 A * 3/1995 Stoops et al. ............ 219/448.12
5,746,114 A * 5/1998 Harris ............................ 99/331

(Continued)

FOREIGN PATENT DOCUMENTS

DE 19714295 A1 * 10/1998
DE 19825047 A1 * 12/1998

(Continued)

OTHER PUBLICATIONS

International Search Report for PCT/EP2007/010447, dated Mar. 11, 2008, 2 pages.

*Primary Examiner* — Crystal J Barnes-Bullock
(74) *Attorney, Agent, or Firm* — Pearne & Gordon LLP

(57) ABSTRACT

The present invention relates to a household appliance for performing a housekeeping task. The household appliance comprises a data input device (16) adapted to remotely sense a property in a sensing area (18), and a controller (22) coupled to the data input device and adapted to control an operation of the household appliance in accordance with the sensed property.

13 Claims, 2 Drawing Sheets

U.S. PATENT DOCUMENTS

| | | | | |
|---|---|---|---|---|
| 5,893,996 | A * | 4/1999 | Gross et al. | 219/447.1 |
| 5,958,272 | A * | 9/1999 | Taplan et al. | 219/445.1 |
| 6,118,107 | A * | 9/2000 | Kobrich | 219/502 |
| 6,133,552 | A * | 10/2000 | Saulnier et al. | 219/446.1 |
| 6,133,559 | A * | 10/2000 | Park | 219/710 |
| 6,281,481 | B1 * | 8/2001 | Tiemann | 219/446.1 |
| 6,350,971 | B1 * | 2/2002 | Smolenski et al. | 219/518 |
| 6,403,932 | B1 * | 6/2002 | Nelson et al. | 219/497 |
| 6,444,958 | B1 * | 9/2002 | Campbell | 219/460.1 |
| 6,453,687 | B2 * | 9/2002 | Sharood et al. | 62/127 |
| 6,462,316 | B1 * | 10/2002 | Berkcan et al. | 219/502 |
| 6,501,054 | B2 * | 12/2002 | Engelmann et al. | 219/497 |
| 6,538,238 | B1 * | 3/2003 | Berkcan et al. | 219/502 |
| 6,614,422 | B1 * | 9/2003 | Rafii et al. | 345/168 |
| 6,813,575 | B2 * | 11/2004 | Laflamme | 702/99 |
| 6,815,648 | B2 * | 11/2004 | Badami et al. | 219/494 |
| 6,924,469 | B1 * | 8/2005 | Strong | 219/714 |
| 6,930,290 | B2 * | 8/2005 | Kijimoto et al. | 219/506 |
| 6,940,048 | B2 * | 9/2005 | Wilkins | 219/494 |
| 7,015,433 | B2 * | 3/2006 | Rado et al. | 219/494 |
| 7,112,766 | B2 * | 9/2006 | Lerner | 219/445.1 |
| 7,342,205 | B2 * | 3/2008 | Wilkins et al. | 219/460.1 |
| 7,409,311 | B2 * | 8/2008 | Imgram et al. | 702/132 |
| 7,473,872 | B2 * | 1/2009 | Takimoto | 219/627 |
| 7,569,798 | B2 * | 8/2009 | Thimm et al. | 219/446.1 |
| 7,699,051 | B2 * | 4/2010 | Gagas et al. | 126/299 D |
| 7,831,321 | B2 * | 11/2010 | Ebrom et al. | 700/87 |
| 7,969,330 | B2 * | 6/2011 | Philipp | 341/33 |
| 8,276,506 | B2 * | 10/2012 | Tojo et al. | 99/334 |

FOREIGN PATENT DOCUMENTS

| | | | | |
|---|---|---|---|---|
| EP | 1137323 | A | | 9/2001 |
| JP | 08014575 | A | * | 1/1996 |
| JP | 2001201053 | A | * | 7/2001 |
| JP | 2004263896 | A | * | 9/2004 |
| JP | 2007205666 | A | * | 8/2007 |
| WO | 2002054169 | A | | 7/2002 |

* cited by examiner

HOUSEHOLD APPLIANCE

TECHNICAL FIELD

The present invention relates to a household appliance for performing a housekeeping task.

BACKGROUND OF THE INVENTION

Household appliances such as cooking ranges and laundering machines for performing housekeeping tasks such as cooking and cleaning, respectively, are traditionally equipped with a user interface that permits a user to control the appliance. The user interface is usually placed on the top or the front side of the appliance, and can comprise an information display and/or a keyboard or user operable buttons or protruding knobs.

However, the presence of such a user interface can make the household appliance difficult to clean, and it also restricts the design possibilities of the appliance.

An alternative user interface is disclosed per se in WO 02/054169. More precisely, WO 02/054169 discloses "a data input device comprising: an illuminator operative to illuminate at least one engagement plane by directing light along said at least one engagement plane; a two-dimensional imaging sensor viewing said at least one engagement plane from a location outside said at least one engagement plane for sensing light from said illuminator scattered by engagement of a data entry object, such as a user's finger, with said at least one engagement plane; a data entry processor receiving an output from said two-dimensional imaging sensor and providing a data entry input to utilization circuitry; and a data entry matrix projector operative to project at least one visually sensible data entry matrix onto a projection surface underlying said at least one engagement plane".

However, in a household appliance for performing a housekeeping task, not only information provided by the user is of interest, but also information on the environment in which the household appliance operates.

SUMMARY OF THE INVENTION

It is an object of the present invention to overcome or at least alleviate the above stated problems, and to provide an improved household appliance.

This and other objects that will be evident from the following description are achieved by means of a household appliance for performing a housekeeping task, the household appliance comprising a data input device adapted to remotely sense a property in a sensing area, and a controller coupled to the data input device and adapted to control an operation of the household appliance in accordance with the sensed property, as stated in the appended claim 1.

Except for forming part of a user interface as in WO 02/054169, the data input device can be modified to sense a property specifically related to the housekeeping task performed by the household appliance, whereby the household appliance automatically may respond to changes in its operative environment without user interaction.

In one embodiment, the household appliance further comprises a cooking plate area at least partly covered by the sensing area, wherein the data input device is adapted to sense the size of an object, such as a pot or pan, placed in the sensing area. Thus, this embodiment of the invention is based on the understanding that the data input device except for forming part of any user interface also or instead can be used to sense the size of a pot or pan placed in the cooking plate area. To this end, the controller is preferably adapted to control a heater of the cooking plate area in accordance with the sensed size, for instance by activating portions of the heater in accordance with the sensed size. Thus, the use of the heater may be optimised automatically without user interaction. Optimising the heater "size" in response to pot size preserves energy and avoids unpleasant heat transfer to the pot handles. The data input device may further be adapted to sense the position of the object, and the heater to be controlled is selected based on the sensed position. This is particularly advantageous if the sensing area covers several heaters.

In another embodiment, the household appliance comprises a cooking plate area at least partly covered by the sensing area, wherein the data input device is adapted to sense a temperature in the sensing area. The data input device may for instance sense the temperature of a pot or pan placed in the cooking plate area, or the temperature of a heater of the cooking plate area. The sensed temperature may for instance be provided as information to a user or utilized to automatically control the household appliance. An advantage with the remote temperature detection is that a temperature measuring device does not have to be provided at the precise location of the measurement.

In another embodiment, the household appliance further comprises a cooking plate area and projection means adapted to direct a visual image on the cooking plate area indicating a hot or cold area of the cooking plate area. In WO 02/054169, a projector is used to project a data entry matrix, such as a keyboard, in association with what is here called the sensing area, to form part of a user interface. This embodiment of the invention is thus based on the understanding that the projection means except for forming part of any user interface also or instead can be used to indicate a hot or cold area of the cooking plate area, to warn a user of a hot area or inform a user of a cold area where the user can put an item not intended to be heated. It should be noted that this embodiment could be used separately, without the data input device.

Further, the data input device and/or projection means can be mounted on a pop-up support receivable within the household appliance, wherein the household appliance is turned off when the pop-up support is in a received position and otherwise turned on. Thus, except for concealing the data input device when not in use, the pop-up support can also be used to turn the household appliance on and off in a simple manner, since the on/off state of the household appliance generally coincides with the on/off state of data input device and/or projection means.

Further, the data input device and/or projection means may be adapted to be oriented in different directions for changing the position of said sensing area and/or visual image. This allows a user to manually select sensing area and/or the area where the visual image is projected.

BRIEF DESCRIPTION OF THE DRAWINGS

This and other aspects of the present invention will now be described in more detail, with reference to the appended drawings showing currently preferred embodiments of the invention.

DETAILED DESCRIPTION OF CURRENTLY PREFERRED EMBODIMENTS OF THE INVENTION

Figure 1A:
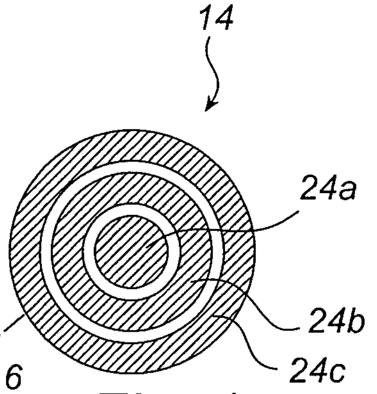
FIG. 1*a* is an enlarged top view of a heater of the household appliance in FIG. 1.
Figure 1:
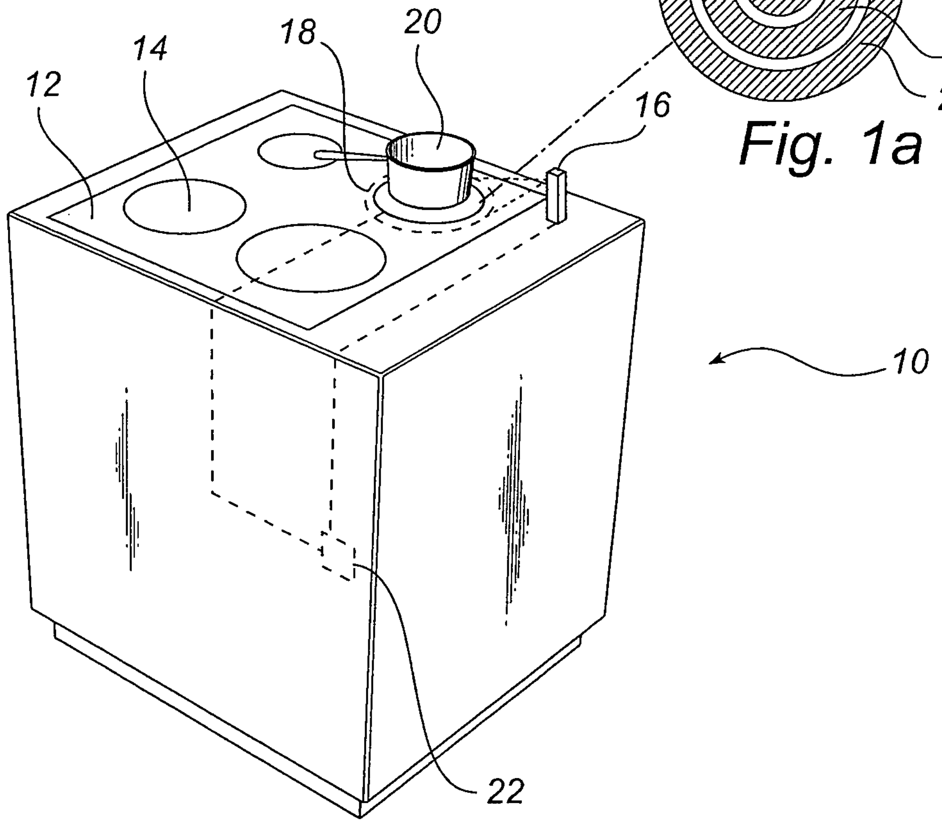
FIG. 1 is a perspective view schematically illustrating a household appliance according to an embodiment of the invention with pot size sensing functionality.

FIG. 1 is a perspective view schematically illustrating a household appliance 10 according to an embodiment of the invention. The household appliance 10, which comprises a cooking plate area 12 with at least one heater 14, is preferably a range, cooker, hob, stove, or the like. The cooking plate area 12 may be of induction, ceramic, or solid plate electric type, or the like.

The household appliance 10 further comprises a data input device 16, in FIG. 1 mounted on a support placed at the side of the cooking plate area 12. The data input device 16 has a sensing area 18, which sensing area 18 here covers one of the heaters 14 of the cooking plate area 12. The data input device 16 is preferably of the type disclosed in WO 02/054169 (with an illuminator and imaging sensor, not shown), modified to remotely sense the size of an object 20 in the sensing area 18, typically a pot or a pan placed on the cooking plate area 12. The data input device 16 is coupled to a controller 22, which in turn is coupled to the heater 14 covered by the sensing area 18 of the data input device 16.

Upon operation, when a pot 20 is placed on the heater 14, the size of the pot 20 is remotely sensed by the data input device 16. The size can for instance be sensed by detecting (by means of the imaging sensor) the amount of light emitted from the data input device 16 (by means of the illuminator) that is scattered or reflected by the pot 20. Information on the sensed size is passed to the controller 22, which in turn controls the heater 14 covered by the sensing area 18 of the data input device 16. More precisely, the controller 22 activates portions of the heater 14 in accordance with the sensed pot size, in order to activate just as much of the heater 14 to match the size of the pot 20 placed on it.

The heater 14 may for instance comprise a number of zones or heater elements 24, as illustrated in more detail in FIG. 1*a*. In FIG. 1*a*, a circular centre element 24*a* is surrounded by two gradually larger ring formed elements 24*b* and 24*c*. The base of the pot 20 may for example match the two inner elements 24*a* and 24*b* of the heater, whereby activation of these two inner elements will be enough to heat the pot 20. On the other hand, for a smaller pot it may be enough to activate the innermost element 24*a* only, while for a larger pot all elements 24*a*-24*c* of the heater can be activated.

In a variant of the household appliance disclosed in FIG. 1, the sensing area of the data input device covers more than one heater. In such a variant, the data input device also senses the position of a pot placed in the sensing area (how to remotely detect position is described per se in WO 02/054169), and the controller selects which one of the heaters covered by the sensing area to be controlled based on the sensed position. Here, the data input device should be placed and/or directed in such a way that one pot is not shaded by another pot.

Optionally, the data input device is arranged such that it can be oriented in different directions, so that a user manually can select a desired pot size sensing area. To facilitate such selection, the sensing area could be indicated visually, for instance by means of the illuminator of the data input device.

Figure 2:
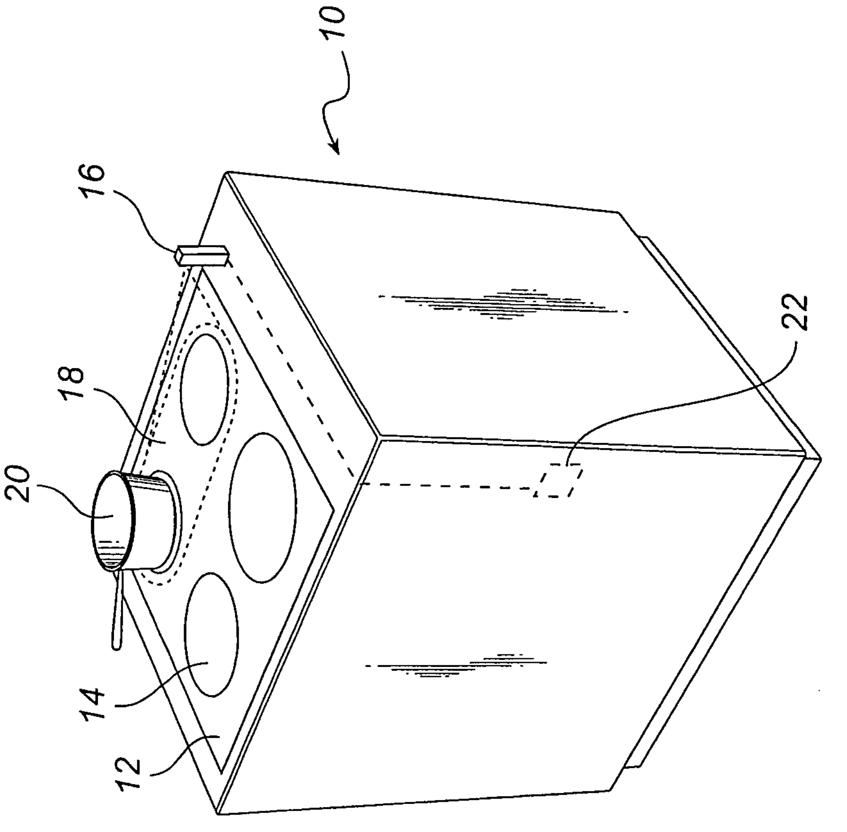
FIG. 2 is a perspective view schematically illustrating a household appliance according to another embodiment of the invention with temperature sensing functionality.

FIG. 2 is a perspective view schematically illustrating a household appliance 10 according to another embodiment of the invention. The household appliance 10, which comprises a cooking plate area 12, is preferably a range, cooker, hob, stove, or the like.

The household appliance 10 further comprises a data input device 16, in FIG. 2 mounted on a support placed at the side of the cooking plate area 12. The data input device 16 has a sensing area 18, which sensing area 18 here covers at least a portion of the cooking plate area 12. The data input device 16 is adapted to remotely sense a temperature in the cooking plate area 12, for instance sense the temperature of a pot or pan 20 placed in the cooking plate area 12, or the temperature of a heater 14 of the cooking plate area 12. To this end, the data input device 16 preferably comprises an IR camera, LED or other known means for remotely detecting temperature. The data input device 16 may also detect the position of the sensed temperature, which is particularly useful in case the sensing area covers several heaters. A controller 22 coupled to the data input device 16 may for instance utilize the sensed temperature (and optionally the position) to provide information on the temperature to a user via a display or the like, or to automatically control the household appliance in accordance with the sensed temperature. In the latter case, a boiling control function could be implemented, wherein the household appliance automatically keeps the contents of a pot at boiling temperature.

Optionally, the data input device is arranged such that it can be oriented in different directions, so that a user manually can select a desired temperature sensing area. To facilitate such selection, the sensing area could be indicated visually.

Figure 3:
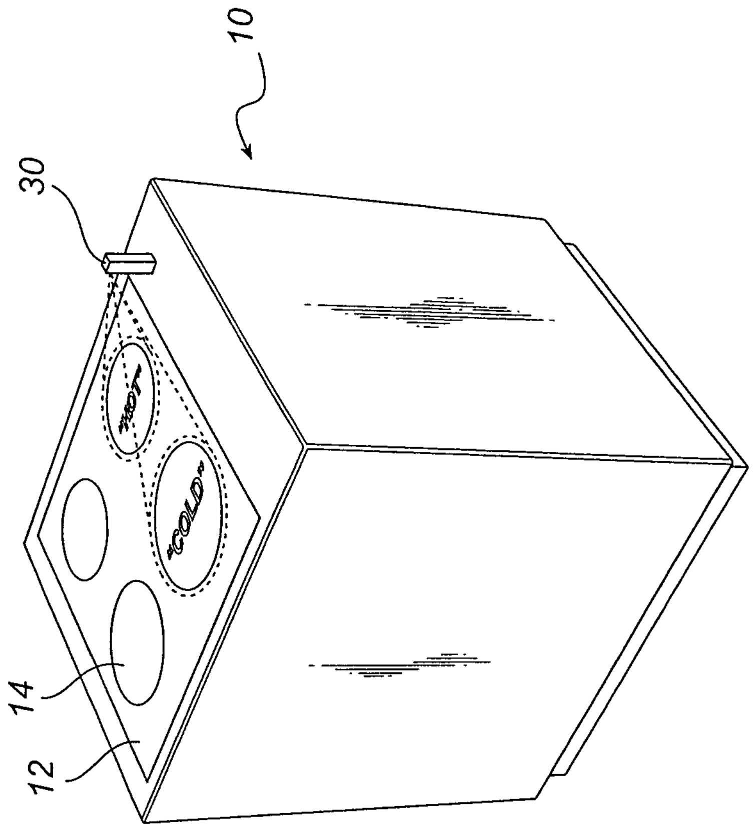
FIG. 3 is a perspective view schematically illustrating a household appliance according to another embodiment of the invention with projection means.

FIG. 3 is a perspective view schematically illustrating a household appliance according to another embodiment of the invention. The household appliance 10, which comprises a cooking plate area 12 with at least one heater 14, is preferably a range, cooker, hob, stove, or the like.

The household appliance 10 further comprises projection means 30 mounted on a support placed at the side of the cooking plate area 12. The projection means 30 comprises a light source (preferably an LED), a projection lens and optionally a panel placed between the light source and projection lens, in order to direct a visual image onto a projection surface. Specifically, in the present embodiment, the projection means 30 is adapted to direct a visual image on the cooking plate area 12 indicating a hot or cold area of the cooking plate area 12, to warn a user of a hot area or inform a user of a cold area where the user can put an item not intended to be heated. To this end, the projection means 30 receives information on the temperature of various areas of the cooking plate area 12, for example the temperature of the heaters 14. In such an example, when the temperature of a certain heater exceeds a certain threshold, the projection means 30 may illuminate this particular heater with a red light or a text warning such as "HOT". Likewise, for a cold area where the temperature does not exceed the threshold temperature, such an area may be illuminated with a blue light or a text such as "COLD".

The information on the temperature may be provided by the data input device described in relation to FIG. 2 above. However, various other solutions for sensing temperature in a range or hob or the like are known per se, which solutions alternatively could be used to provide the temperature information.

Optionally, the projections means is arranged such that it can be oriented in different directions, so that a user manually can select where the visual image is to be projected.

The support whereto the data input device 16 and/or the projection means 30 above is/are mounted may be a user operated pop-up support receivable within the household appliance 10. The rational behind the pop-up support per se is that data input device and/or projection means may be concealed when not in use. This concept is in the present invention further extended by connecting the pop-up support to the main power switch (not shown) of the household appliance. Specifically, the household appliance is turned off when the pop-up support is in a received position and turned on when the pop-up support is in an extracted position. This offers a simple and intuitive way to turn the appliance on and off. Pressing the support when it is in the received position will make it shift to the extracted position, whereby the appliance is turned on, while pushing the support from the extracted position to the received position will turn the appliance off. Optionally, the pop-up support is adapted to be oriented in different directions, to allow a user to manually select sensing area and/or the area where the visual image is projected.

The person skilled in the art realizes that the present invention by no means is limited to the preferred embodiments described above. On the contrary, many modifications and variations are possible within the scope of the appended claims. For instance, the means for remotely detecting temperature discussed in relation to the embodiment of FIG. 2 could be the same as the imaging sensor discussed in relation to the embodiment of FIG. 1, whereby the two embodiments could be combined. Also, the pot size sensing (FIG. 1) and/or temperature sensing (FIG. 2) could be combined with the hot/cold warning projection (FIG. 3). Also, the above described functions and features of the present invention may advantageously be added as extra functions and features of a virtual user interface, which virtual user interface can be of the type described in WO 02/054169.

The invention claimed is:

1. A household appliance (10) for performing a housekeeping task, the household appliance comprising a data input device (16) supported at an external location outside of the household appliance relative to a sensing area (18) and separated from the sensing area (18) of the household appliance (10), wherein the data input device (16) is adapted to remotely sense, from the external location, a physical dimension of an object (20) in the sensing area (18), and a controller (22) coupled to the data input device and adapted to control an operation of the household appliance in accordance with the sensed physical dimension of the object (20).

2. A household appliance according to claim 1, wherein the physical dimension is related to the housekeeping task.

3. A household appliance according to claim 1, further comprising a cooking plate area (12) at least partly covered by said sensing area, wherein the physical dimension of the object (20) sensed by the data input device is a size of the object (20) supported by the cooking plate area (12) in the sensing area.

4. A household appliance according to claim 3, wherein the controller is adapted to control a heater (14) of the cooking plate area in accordance with the sensed size, preferably by activating a portion (24), but less than all, of the heater in accordance with the sensed size.

5. A household appliance according to claim 4, wherein the data input device is further adapted to sense a position of the object, and the portion (24) of the heater to be activated is selected based on the sensed position.

6. A household appliance according to claim 1, further comprising a cooking plate area at least partly covered by the sensing area, wherein the data input device is adapted to sense a temperature in the sensing area.

7. A household appliance according to claim 1, further comprising a cooking plate area (12) and projection means (30) adapted to direct a visual image on the cooking plate area indicating a hot or cold area of the cooking plate area by transmitting the visual image from the projection means at a remote location to the cooking plate area.

8. A household appliance according to claim 7, wherein at least one of the data input device and projection means is mounted on a pop-up support (40) receivable within the household appliance, and wherein the household appliance is turned off when the pop-up support is in a received position and otherwise turned on.

9. A household appliance according to claim 7, wherein at least one of the data input device and projection means is adapted to be oriented in different directions for changing a position of said sensing area and/or visual image.

10. A household appliance according to claim 7, wherein at least one of the data input device and projection means forms part of a virtual user interface of the household appliance.

11. A household cooking appliance (10) comprising:

a cooking plate area (12) comprising a heater (14) for generating heat to be used for cooking and an external surface on which a cooking utensil is to be supported during said cooking;

a data input device (16) arranged to extend into an input device plane that is elevated vertically above a cooking plate plane in which the cooking plate area (12) is located, wherein the data input device (16) remotely senses a sensed property from the input device plane, the sensed property comprising a size of the cooking utensil supported by the external surface of the cooking plate area (12); and a controller (22) coupled to the data input device (16) and adapted to control operation of the heater (14) during said cooking based at least in part on the sensed property.

12. A household appliance according to claim 11, wherein the controller (22) is adapted to control the heater (14) in accordance with the sensed size of the cooking utensil by activating a portion (24), but less than all, of the heater (14) in accordance with the sensed size of the cooking utensil remotely sensed by the data input device (16).

13. A household appliance (10) for performing a housekeeping task, the household appliance comprising:

a data input device (16) supported at an external location relative to a sensing area (18) and separated from the sensing area (18) of the household appliance (10), wherein the data input device (16) is adapted to remotely sense, from the external location, a property in the sensing area (18);

a cooking plate area (12);

projection means (30) adapted to direct a visual image on the cooking plate area indicating a hot or cold area of the cooking plate area by transmitting the visual image from the projection means at a remote location to the cooking plate area; and a controller (22) coupled to the data input device and adapted to control an operation of the household appliance in accordance with the sensed-property.

* * * * *

UNITED STATES PATENT AND TRADEMARK OFFICE

CERTIFICATE OF CORRECTION

PATENT NO. : 8,420,984 B2
APPLICATION NO. : 12/520118
DATED : April 16, 2013
INVENTOR(S) : Kaiser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this
Eighth Day of September, 2015

Michelle K. Lee
*Director of the United States Patent and Trademark Office*